United States Patent
Zschunke et al.

(10) Patent No.: US 7,515,645 B2
(45) Date of Patent: Apr. 7, 2009

(54) METHOD FOR DIVIDING THE BIT RATE OF QPSK SIGNALS INTO TWO OR SEVERAL SUBCHANNELS

(75) Inventors: Willmut Zschunke, Darmstadt (DE); Khishigbayer Dushchuluun, Darmstadt (DE)

(73) Assignee: Interessengemeinschaft für Runfunkschutzrechte GmbH Schutzrechtsverwertung & Co. KG, Dusseldorf (DE)

(*) Notice: Subject to any disclaimer, the term of this patent is extended or adjusted under 35 U.S.C. 154(b) by 447 days.

(21) Appl. No.: 10/522,861

(22) PCT Filed: Jul. 29, 2003

(86) PCT No.: PCT/EP03/08335

§ 371 (c)(1),
(2), (4) Date: Jan. 31, 2005

(87) PCT Pub. No.: WO2004/014034

PCT Pub. Date: Feb. 12, 2004

(65) Prior Publication Data

US 2006/0056535 A1 Mar. 16, 2006

(30) Foreign Application Priority Data

Jul. 31, 2002 (DE) .............................. 102 34 823

(51) Int. Cl.
*H04L 27/10* (2006.01)
(52) U.S. Cl. ................ 375/279; 375/295; 375/316; 375/348; 375/350; 375/280; 375/281; 455/23; 398/188

(58) Field of Classification Search ................. 375/279, 375/295, 316, 348, 350, 280, 281; 398/188; 455/23

See application file for complete search history.

(56) References Cited

U.S. PATENT DOCUMENTS

| 4,680,777 A | 7/1987 | Saha |
| 6,278,732 B1 | 8/2001 | Beidas et al. |
| 2002/0181547 A1 * | 12/2002 | Feher .......................... 375/130 |

OTHER PUBLICATIONS

Gruenbacher D M et al: "N Dimensional Orthogonal QPSK Signaling with Discrete Prolate Spheroidal Sequences" Radio and Wireless Conference, 1998, Colorado Springs, Co, USA Aug. 9-12, 1998, pp. 63-68, XP 010296329 New York, USA (Intl. Srch. Rep.) Enclosed.
Saha, Debarata, Birdsall, Theodore G.: Quadrature-Quadrature Phase-Shift Keying, In: IEEE Transactions and Communications, vol. 37, No. 5, May 1989, S.437-448. (Specification & German Priority) Enclosed.

(Continued)

*Primary Examiner*—Shuwang Liu
*Assistant Examiner*—Helene Tayong
(74) *Attorney, Agent, or Firm*—Collard & Roe, P.C.

(57) ABSTRACT

The invention relates to a method for dividing the bit rate of QPSK signals by splitting the spectrum of said QPSK signals into at least two channels having band-limited filters in the modulator and demodulator. The prefiltered QPSK signal is split into at least one real and at least one imaginary spectrum at the transmitter end, is transmitted in frequency multiplex, and the filters in the modulator of the transmitter and the demodulator of the receiver are dimensioned according to the transmission function.

13 Claims, 17 Drawing Sheets

OTHER PUBLICATIONS

Sari, Hikmet: A generalization of multidimensional modulation in: IEEE Communications, 1995. ICC 95 Seattle, Gateway to Globalization, 1995 IEEE International Conference on, vol. 2, Jun. 18-22, 1995 pp. 683-687 vol. 2. (German Priority) Enclosed.

Vigil, A. J. u .a.: Finite Truncated Cosine Series Design of Full Response Signaling Offset Binary Modulation Systmes, in: IEEE Transactions on Communications, vol. 42, No. 2/3/4, Feb./Mar./Apr. 1994, 5. 1465-1470. (German Priority) Enclosed.

Waldeck B H et Al: "Performance Evaluation of TFO-$Q^2$PSK in Gaussian, Multipath and Fading Channels" 1999 Ieee Africon 5th, Africon Conference in Africa, Cape Town, South Africa, Sep. 28, 1999-Oct. 1999, pp. 233-238 XP 000895832 New York, USA (Intl. Srch. Rep.) Enclosed.

IEEE Transactions on Communications COM-15, No. 6 (Dec. 1967) pp. 805-811 Saltzberg, Burton, R. (Specification) Enclosed.

IEEE Transactions on Communications, vol. 42, No. 2/3/4, Feb./Mar./Apr. 1994, S. 403-409. Visintin, Monica u. a.: Four-Dimensional Signaling for Bandlimited Channels, / In (German Priority) Encl.

* cited by examiner

The starting point here is the ideal low-pass

Step 1: Select $P_1^2$ in such a manner that the zero points are at a multiple of $1/f_g$ and determine $P_1$ Step 2: Select $P_{2m} = P_2 P_2^*$ as $P_{2m} = H - P_1^2$ and from that $P_2$ Both filters have Nyquist flanks $P_1 P_2^*$ or $P_2 A P_1^*$ are symmetrical to $\omega_g/2$ ~> no cross-talk Proof:

Special case:

FDM

Zeros at multiples of $1/f_g$ ~> no cross-talk

Avoidance of perpendicular flanks by means of Nyquist flank

No cross-talk if $P_1$ does not fall into the Nyquist flank N at $f_g$

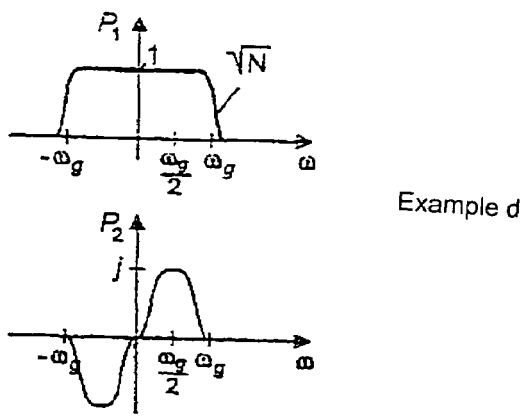
Example d
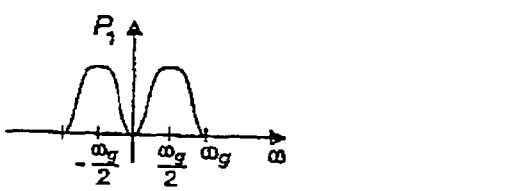
Example e
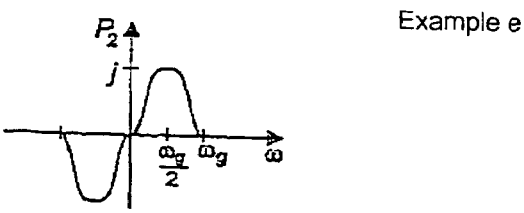
Example f
Multi-carrier system
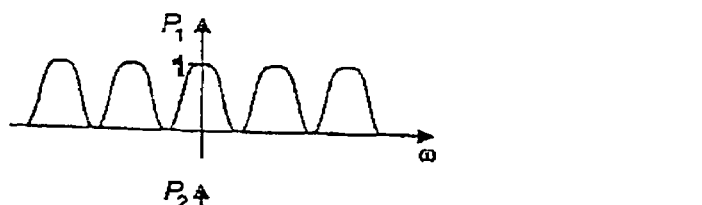
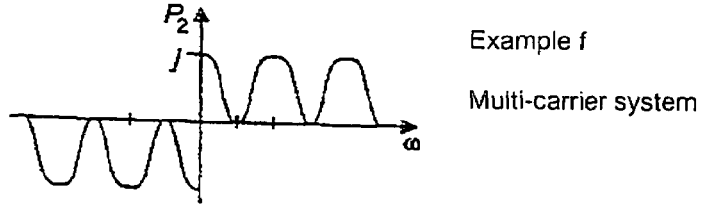
Fig. 6
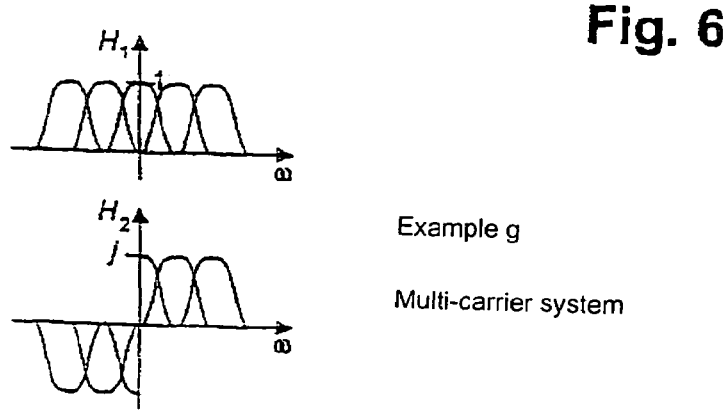
Example g
Multi-carrier system

METHOD FOR DIVIDING THE BIT RATE OF QPSK SIGNALS INTO TWO OR SEVERAL SUBCHANNELS

CROSS REFERENCE TO RELATED APPLICATIONS

Applicants claim priority under 35 U.S.C. §119 of German Application No. 102 34 823.5 filed on Jul. 31, 2002. Applicants also claim priority under 35 U.S.C. §365 of PCT/EP2003/008335 filed on Jul. 29, 2003. The international application under PCT article 21 (2) was not published in English.

BACKGROUND OF THE INVENTION

1. Field of the Invention

The invention relates to a method for dividing the bit rate of QPSK signals into at least two sub-channels having band width limited filters in the modulator and the demodulator, by means of splitting the bit current of the QPSK signals.

2. Description of the Related Art A method of the type is known from IEEE 1999, pages 233 to 238, which method indicates orthogonal pulse shapes in three different ways. In the case of the first method, a low-pass having Nyquist flanks is used, which is operated at half the possible bit rate. The pulse that is orthogonal to this is implemented by means of a time shift. The spectra of the two pulses lie in the same frequency range. Use on multi-carrier systems is not provided. The second method that is used also has the result that the spectra lie in the same frequency range. With the third method, a duobinary signal is generated, the pulse responses of which are limited in terms of time, so that the spectra theoretically reach into infinity. In this connection, the second pulse is also time-shifted, which leads to the spectrum that lies in the same frequency range.

Four orthogonal pulse shapes that can be transmitted in the same channel are known from IEEE 1998, pages 63 to 66. These are attributed to the discrete prolate spheroidal sequences.

In the manual by Docker, Peter, "Datenübertragung", Volume I, Fundamentals, $2^{nd}$ edition 1983, Berlin, which appeared in the Springer Verlag, ISBN 3-540-12117-X, the Nyquist conditions in the case of a data transmission method are discussed on pages 110 to 124. On page 118 ff., the partial response method is described. On pages 144-150 of the manual, amplitude modulation with one-sided band transmission and with remaining side band transmission are described.

In the manual by J. Huber: "Trelliscodierung", which appeared in the Springer Verlag in 1992 under the series Nachrichtentechnik, 21, ISBN 3-540-55792-X, modulation with time-limited signal elements in the coding and modulation of pulses is described on page 12, furthermore digital pulse amplitude modulation, which is also used in the inventive method, is described on page 13 ff.

Modulation systems for QPSK, MSK, SFSK, and DSFSK signals are furthermore known from IEEE Transactions on Communications, Vol. 42, No. 2/3/4, Feb./Mar./Apr. 1994, pages 1465 ff.

Furthermore, the basics of the PSK method are known from the technical manual "Nachrichtentechnik" by E. Herter/W. Lörcher, $5^{th}$ edition, which appeared in the Hanser Verlag in 1990, pages 110 ff., and the implementation of PSK modulators and demodulators and frequency multiplication were described there. Thus it is possible to generate a carrier $2f_T$ from a 2-PSK signal, by means of squaring, from which the desired carrier $f_T$ results afterwards, by means of frequency division. For this, it is indicated that in general, squaring has to occur in the case of an N-PSK signal ld(n)rnd. During squaring, the phase angles are doubled. After the first squaring step at 2-PSK, the signal therefore is given the phase position 0 and 360°. But since these phase positions are the same, the spectrum of the signal that has been squared twice contains contributions, after the phase angle doubling, which point in the same direction. Seen spectrally, this means that the desired line is reached at a multiple of the original carrier frequency $f_T$, for example at four $f_T$. The reference carrier of the frequency $f_T$ that is obtained by means of frequency division, in this connection, has a phase that is displaced by $n \times \pi/2$ (n=0...3), as compared with the correct zero phase.

From the IEEE Transactions on Communications 37, No. 5 (May 1989), pages 437 to 448, a proposal is known how the bit rate of QSPK can be doubled by adding a second orthogonal signal. FIG. 4 on page 447 shows such signal shapes. Because of the perpendicular flanks of the pulses, the band width is very great, i.e. the orthogonality is lost when the band width is limited, and inter-symbol interference (ISI) and cross-talk (ÜS) occur between the channels. At the end of the essay, the authors, D. Saha and G. Birdsall, discuss systems limited in band width, which use band width limited transmission filters $P_1$ and $P_2$ and corresponding matched filters $P_1^*$ and $P_2^*$ on the receiving side (FIG. 13 on page 446). The bit rate $1/T=2f_g$ for one branch of a QPSK system (in other words a total of $4f_g$) is split into ½T twice there, and is therefore the same as for QPSK. This arrangement is used for the sine carrier and the cosine carrier, in each instance. The authors make the statement that there are infinitely many possibilities for the pairs $P_1$ and $P_2$, and give three examples in FIG. 14 on page 447, without the related pulse responses of the individual filters $P_1$ and $P_2$, the transmission and reception filters $P_1 P_1^*$ and $P_2 P_2^*$, and do not discuss the cross-talk $P_1 P_2^*$. Since the filters $P_1$ are real and $P_2$ are imaginary, it holds true that $P_1^* = P_1$ and $P_2^* = -P_2$. A closer examination shows that the conditions free of ISI and ÜS can only be achieved with the examples (a) and (b), and that the example (c) according to FIG. 14 does not fulfill the conditions, in disadvantageous manner.

The idea of adding a second pulse, orthogonal to the control pulse of the QPSK, for modulating the sine carrier and the cosine carrier, is also known from U.S. Pat. No. 4,680,777.

SUMMARY OF THE INVENTION

Proceeding from the state of the art according to the IEEE reference, the invention is based on the task of indicating a method that fulfills the conditions: free of inter-symbol interfrequency (ISI) and cross-talk (ÜS) between the channels, and reduces the infinitely many possibilities, as mentioned, to a class of filters, in its implementation.

The stated task is accomplished by the method indicated in claim 1, in the interaction of the individual method steps; and indicates the division of the spectrum of the QSPK signals into at least two frequency bands, the transmission of the same in frequency multiplex, and the dimensioning of the filters in the modulator and the demodulator as a function of the transmission function.

Advantageous further method steps and their embodiments are indicated, as a supplement, in the dependent claims.

BRIEF DESCRIPTION OF THE DRAWINGS

The invention will be explained in detail in the following, based on the FIGS. 1 to 17 shown in the drawings.

FIG. 6 shows possibilities of a method implementation of the filtering of the signals $P_1$ and $P_2$ without cross-talk and the transition to a multi-carrier system;

DETAILED DESCRIPTION OF PREFERRED EMBODIMENTS

Figure 1:
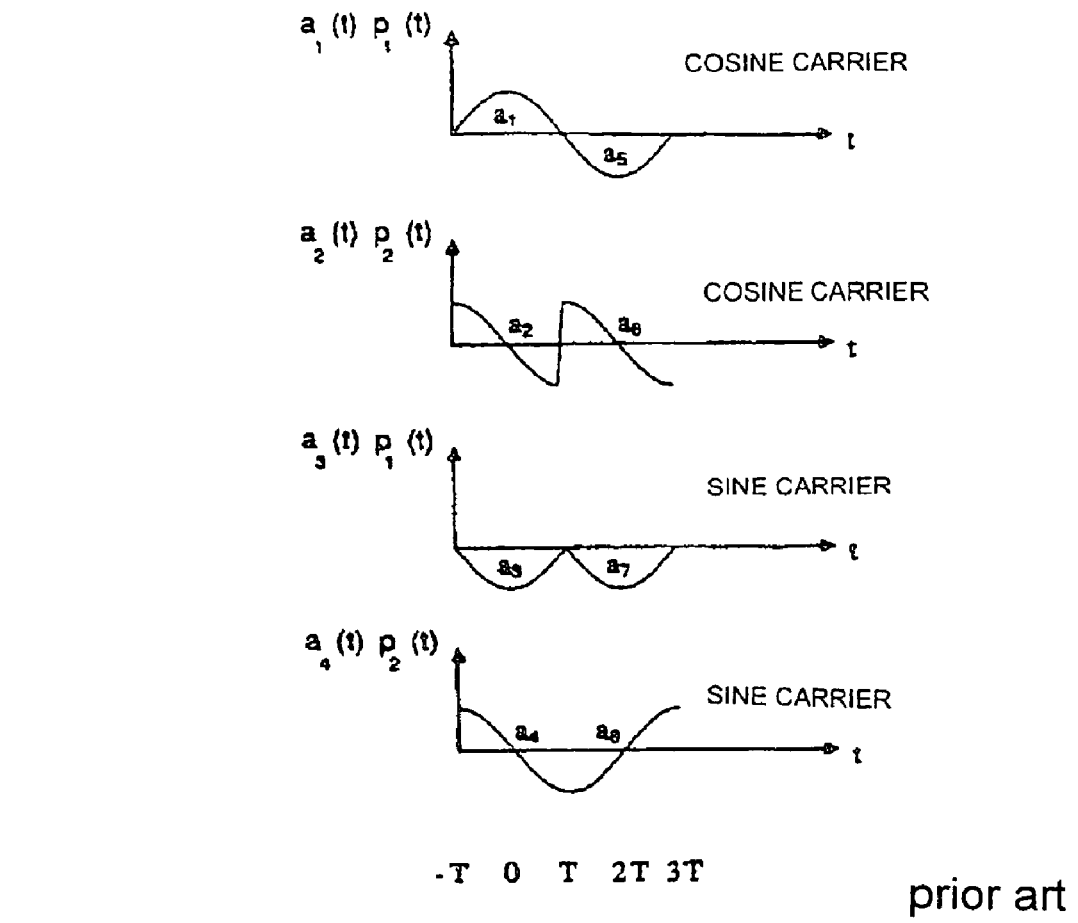
FIG. 1 shows the orthogonal shapes known from the IEEE reference mentioned initially.

In FIG. 1, the orthogonal pulse shapes known from the IEEE reference mentioned initially are shown.

Figure 2:
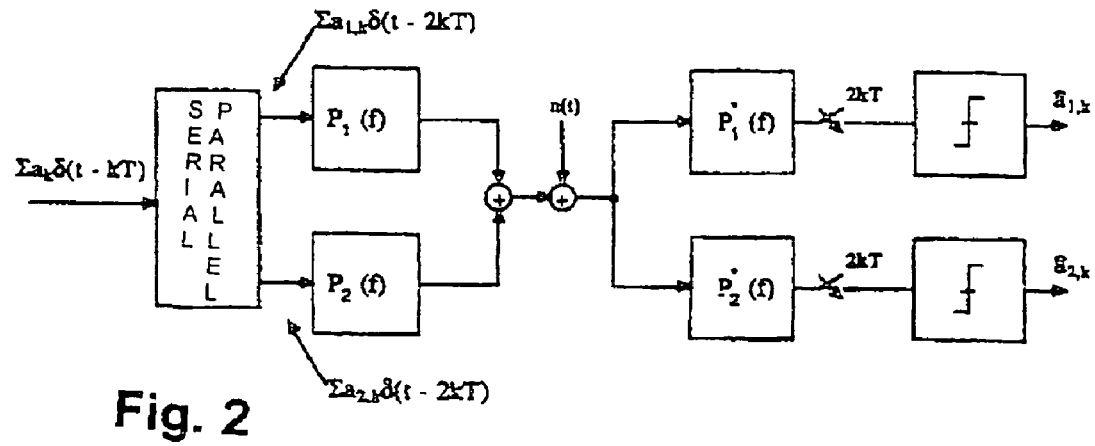
FIG. 2 shows the basic band model of a Q²PSK transmitter and receiver as it can be derived from FIG. 13 of the IEEE reference using the example of a transmission and reception branch for an orthogonal carrier.
Figure 13:
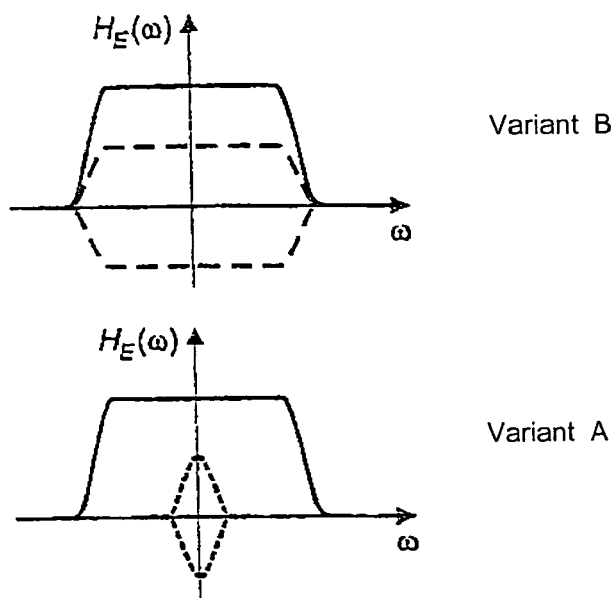
FIG. 13 shows a Variant A in which IKQÜS occurs from the overlapping on the remaining side band flank (RSB flank)

In FIG. 2, the basic band model of a Q²PSK transmitter and receiver, as it can be derived from FIG. 13 of the IEEE reference, is shown using the example of a transmission and reception branch for an orthogonal carrier. On the transmitter side, a serial parallel conversion is performed first, and the converted signal is passed to the two filters $P_1$ and $P_2$ The signal that has been split in this manner is passed to an addition stage after filtering, modulated with a cosine carrier and, in a second, identical branch, with a sine carrier, and transmitted to the receiver with cosine and sine demodulators. The demodulated signals go to the two signal branches having filters $P_1^*$ and $P_2^*$, are scanned with multiples of $f_T$• and decided for the data signals in a threshold decision.

Figure 3:
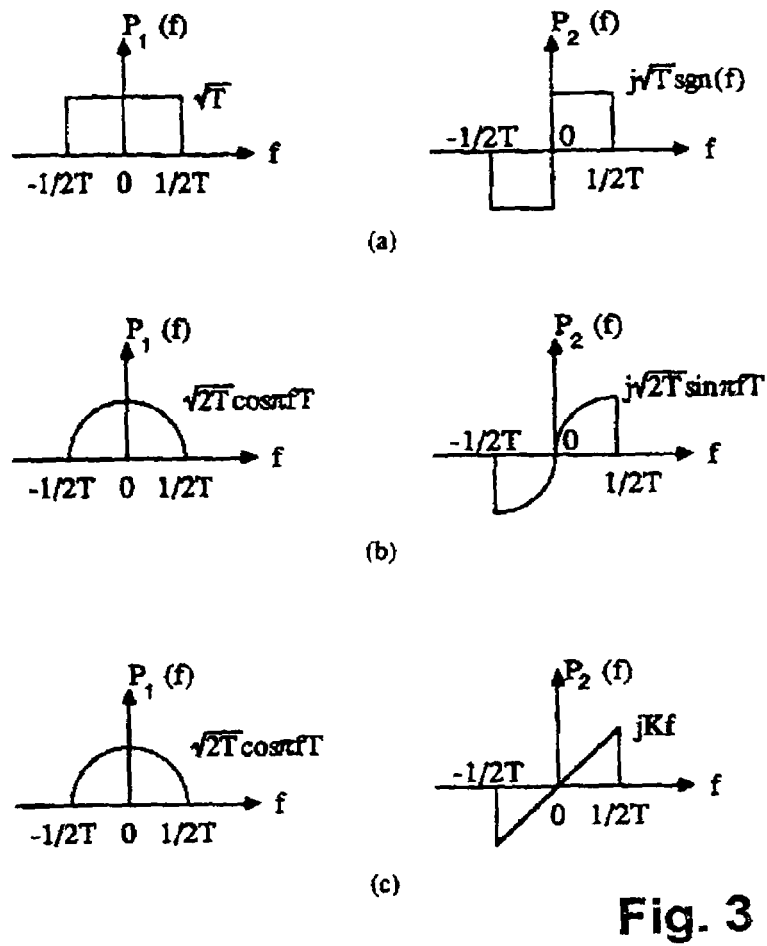
FIG. 3 shows the examples that are evident from the IEEE reference, FIG. 14, mentioned initially.
Figure 14:
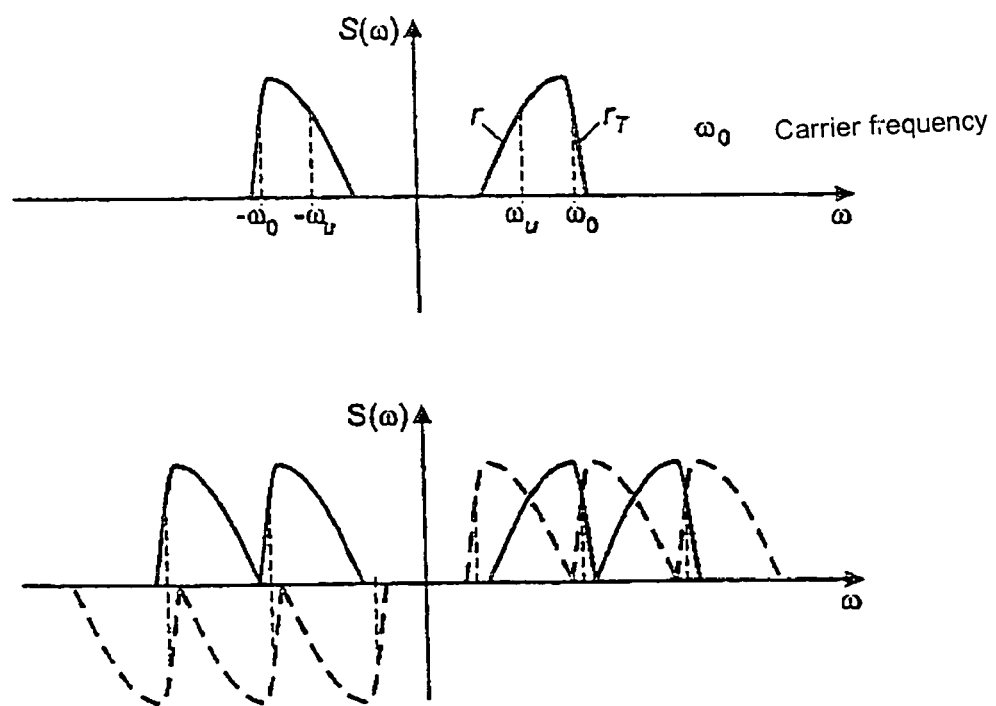
FIG. 14 shows an advantageous arrangement of channels in the case of multi-channel transmission.

In FIG. 3, the examples that are evident from the IEEE reference, FIG. 14, mentioned initially, are reproduced. Specifically, in FIGS. 3a, 3b, and 3c, the pulse responses to the examples of filter pairs a, b, c in FIG. 3 are shown, namely divided according to transmission filter and pulse response of the overall system, and the cross-talk behavior. FIG. 3c shows that the requirements: free of inter-symbol interfrequency (ISI) and cross-talk (ÜS) are not precisely fulfilled.

The consideration of the invention using FIGS. 4 to 17 proceeds from these known systems.

The filters used for signal splitting can be filters that are adjacent to one another in terms of frequency (Variant A), or filters that lie in the same frequency range (Variant B). The method according to the invention furthermore solves the use of a duobinary coding. Furthermore, the method according to the invention can be expanded from a draft method of two (Q²PSK) to n (Q″PSK) partial signals.

Furthermore, the open question of the use of a duobinary coding is solved using the method. By replacing the filters $P_2 \ldots P_n$ with a serial circuit of a low-pass filter $P_1$ and subsequent modulation with equidistant sine and cosine carriers, a multi-carrier system is obtained. Its implementation can take place similar to the case of OFDM (Orthogonal Frequency Division Multiplex) by way of DFT (Discrete Fourier Transformation) and IDFT (Inverse DFT). As compared with OFDM, however, Q″PSK offers several advantages, namely a more compact spectrum, a lower crest factor, less sensitivity in the case of frequency-selective channels and with regard to carrier synchronization.

Figure 4:
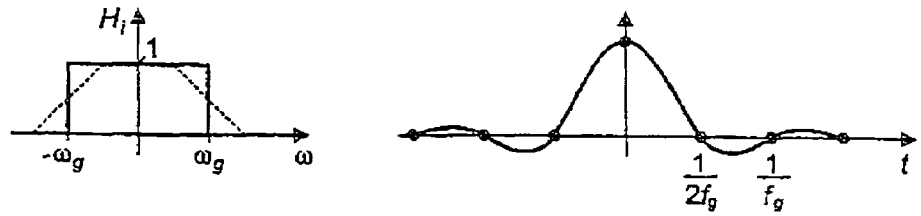
FIG. 4 shows a QPSK having an ideal low-pass channel $H_i$ having the band width $\omega_g$ in which the signal progressions of the filters and the individual design steps are indicated.
Figure 4:
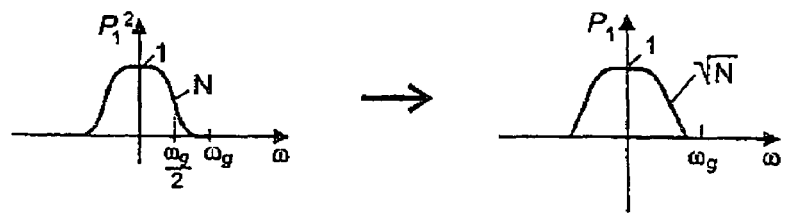
Figure 4:
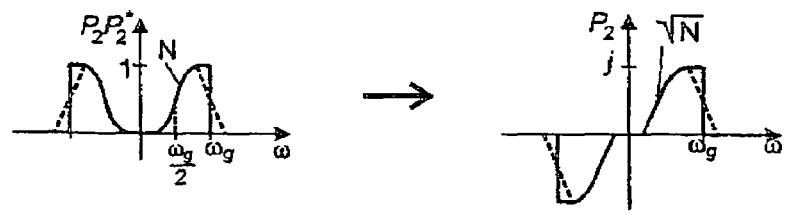
Figure 4:
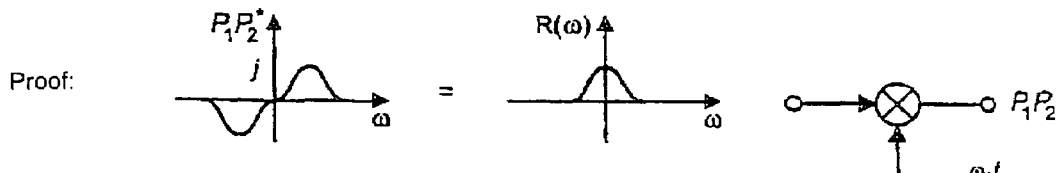
Figure 4:
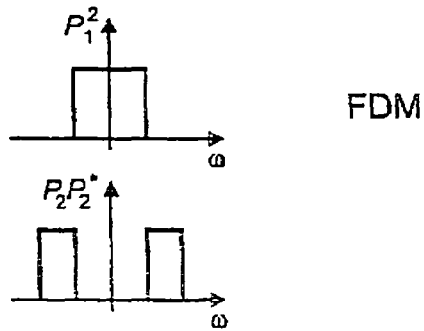

In the following, the design of Q²PSK systems according to the invention will first be described. We proceed from a QPSK having an ideal low-pass channel $H_i$ having the band width $\omega_g$ according to FIG. 4, in which the signal progressions of the filters and the individual design steps are indicated. The low-pass channel $H_i$ can, as indicated with a broken line, be changed by means of a Nyquist flank at $\omega_f$, for a practical implementation, without any change occurring at the zero passages of the pulse response at multiples of $\frac{1}{2}f_g$, as is evident from the diagram in the first line at the top and the pulse response next to it. Since transmission occurs at half the bit rate $1/f_g$ in the $P_1$ and $P_2$ branch (FIG. 2 or FIG. 7 or FIG. 8), a low-pass having half the band width can be used for $P_1^2$ (second line in FIG. 4). In FIG. 4, $P_1^2$ was already supplemented with a Nyquist flank at $\omega_g/2$. The zero places of the related pulse response accordingly lie at multiples of $1/f_g$ (representation line 1 in FIG. 4, on the right). If one forms the zero places of the pulse response belonging to $P_{2m} = P_2 P_2^*$ also lie at $1/f_g$, so that transmission can also take place at the bit rate $1/f_g$ via this channel. It is evident from the second step in FIG. 4 that $P_2 P_2^*$ has the same Nyquist flank at $\omega_g/2$ as $P_1^2$, so that in this range, $P_1^2 + P_2 P_2^* = 1$.

The division of the PSK signal into the real $P_1$ and the purely imaginary $P_2$ is easily possible by means of adding the root sign √N and the corresponding sign at $P_2$, thereby finding the desired pulse former pairs $P_1$ and $P_2$. When speaking about the pulses $P_1$ and $P_2$, these are the pulses that can be captured at the outputs of the filters $P_1$ and $P_2$, and the same also applies to $P_1^*$ and $P_2^*$. If the method according to the invention is used, then no cross-talk caused by $P_1 P_2^*$ or $P_2 P_1^*$ occurs, either. This is discussed and documented in the lower part of FIG. 4. Because of the same Nyquist flanks at $\omega_g/2$, a cross-talk spectrum results that is symmetrical to $\omega_g/2$ and point-symmetrical to $\omega=0$. Since $P_1$ and $P_2$ have orthogonal carriers (are in square with one another), this cross-talk can also be referred to as square cross-talk. This spectrum includes a pulse response that has zero places at the multiple of $1/f_g$ and therefore does not interfere in the scanning points of the wanted signal. This can be documented in that $P_1P_2^*$ can be imagined by conversion of a real spectrum $R(\omega)$ with sin $\omega_g/2t$.

By means of this sine carrier, zero places then occur in the related time signal, at the multiple of $1/f_g$. This adjacent arrangement of the filters is referred to as Variant A.

Furthermore, a special case is shown in FIG. 4, at the bottom. Specifically, if the Nyquist flank runs vertically, the two transmission channels are separated by frequency multiplex, as is evident from the last diagram. However, for an implementation, the vertical flank of $P_2$ at the border frequency $\omega_g$ is disruptive. Proceeding from a Nyquist flank of $H_t$, it is possible, as is evident from FIG. 5, in which the conditions for avoiding cross-talk (ÜS) are indicated, to apply a Nyquist flank also at $\omega_g$ in the case of $P_{2m}=P_2P_2^*$. This reaches down into the region below $\omega_g$. In order to avoid cross-talk (ÜS), in this case $P_1$ is not allowed to drop down into the region of this Nyquist flank.

In this way, it is assured that the two channels are separated by means of frequency multiplex, but are allowed to overlap with their Nyquist flanks at $\omega_g/2$, without any cross-talk (ÜS) occurring.

Figure 5:
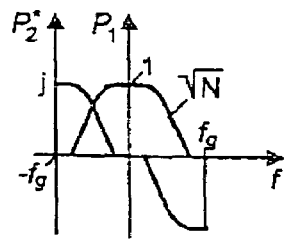
FIG. 5 shows a Nyquist flank of $H_i$, in which the conditions for avoiding cross-talk between the PSK signals are indicated, applied at $\omega_g$ in the case of $P_{2m} = P_2 P_2^*$.
Figure 5:
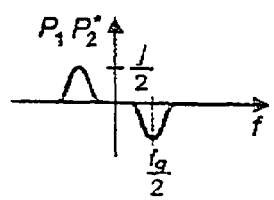
Figure 5:
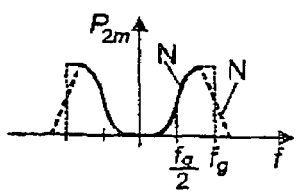
Figure 5:
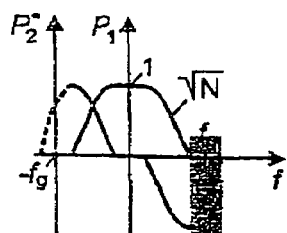
Figure 5:
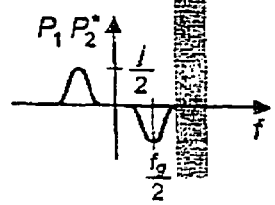

FIG. 5 indicates the conditions for avoiding cross-talk (ÜS), between the PSK signals. It can be shown that FIG. 3a can also be interpreted as a special case of the design method, if the additive Nyquist flanks $P_a$ are selected accordingly.

Figure 3A:
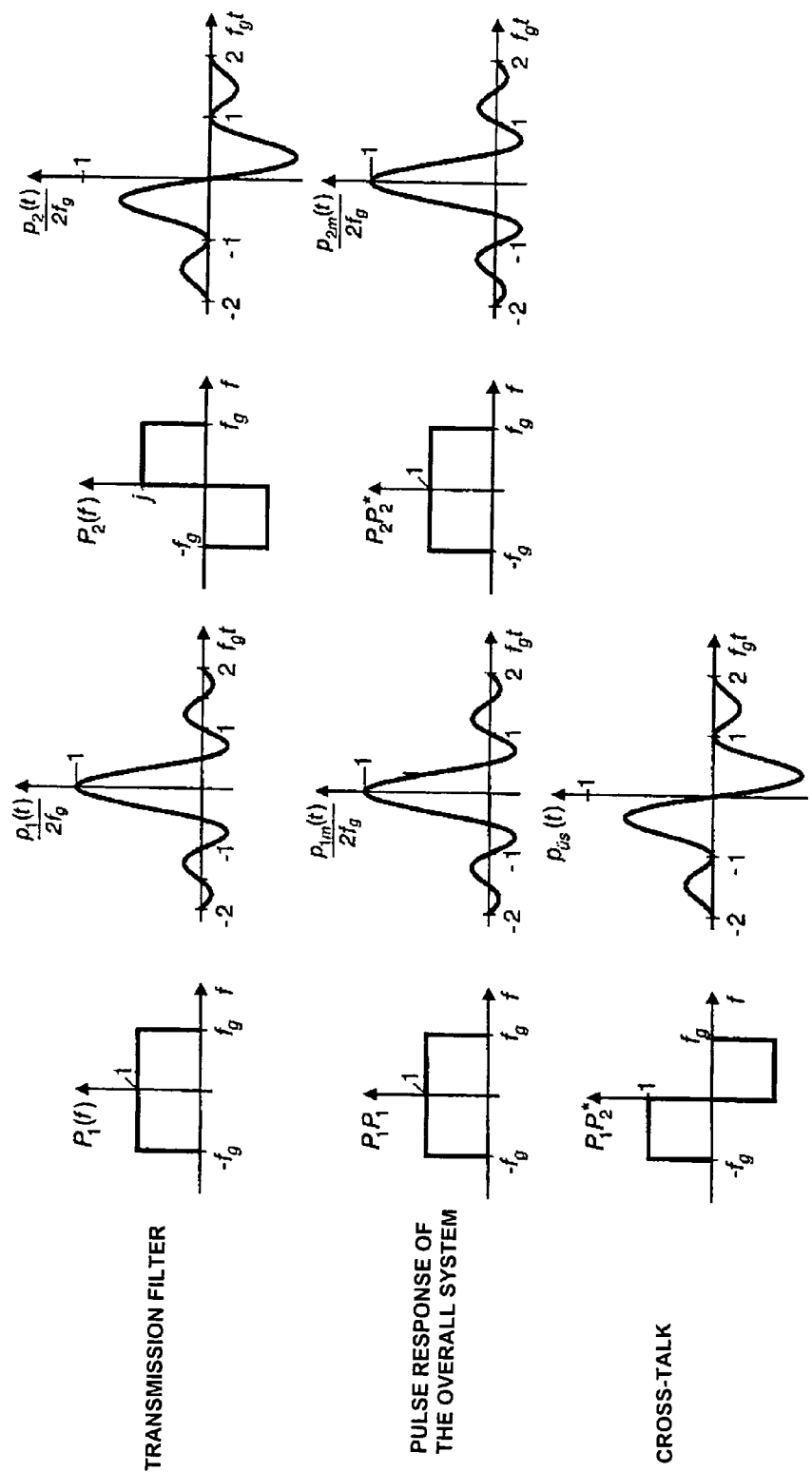
FIGS. 3a, 3b and 3c show the pulse responses to the examples of filter pairs a, b, c in FIG. 3.
Figure 3B:
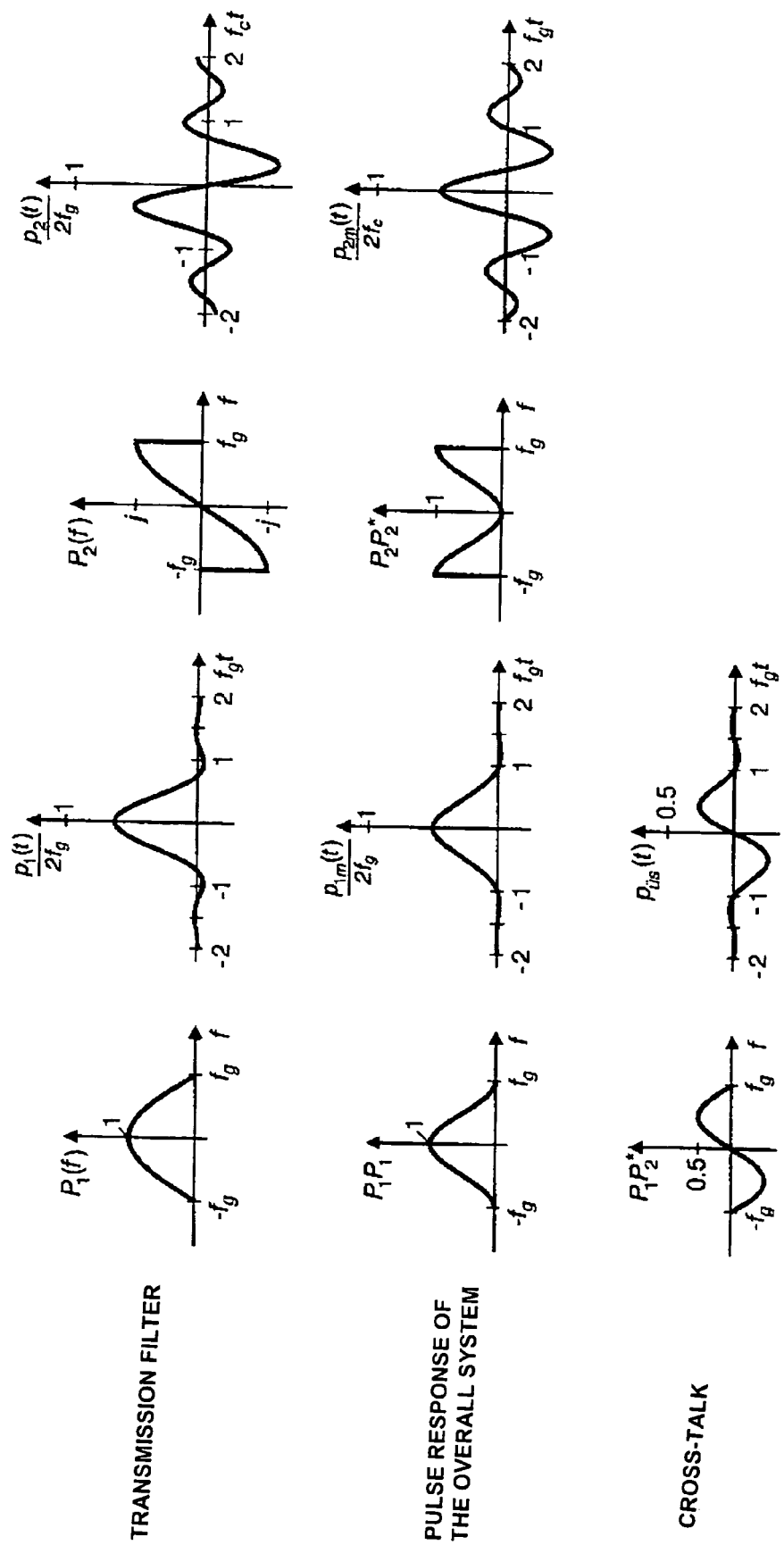
Figure 3C:
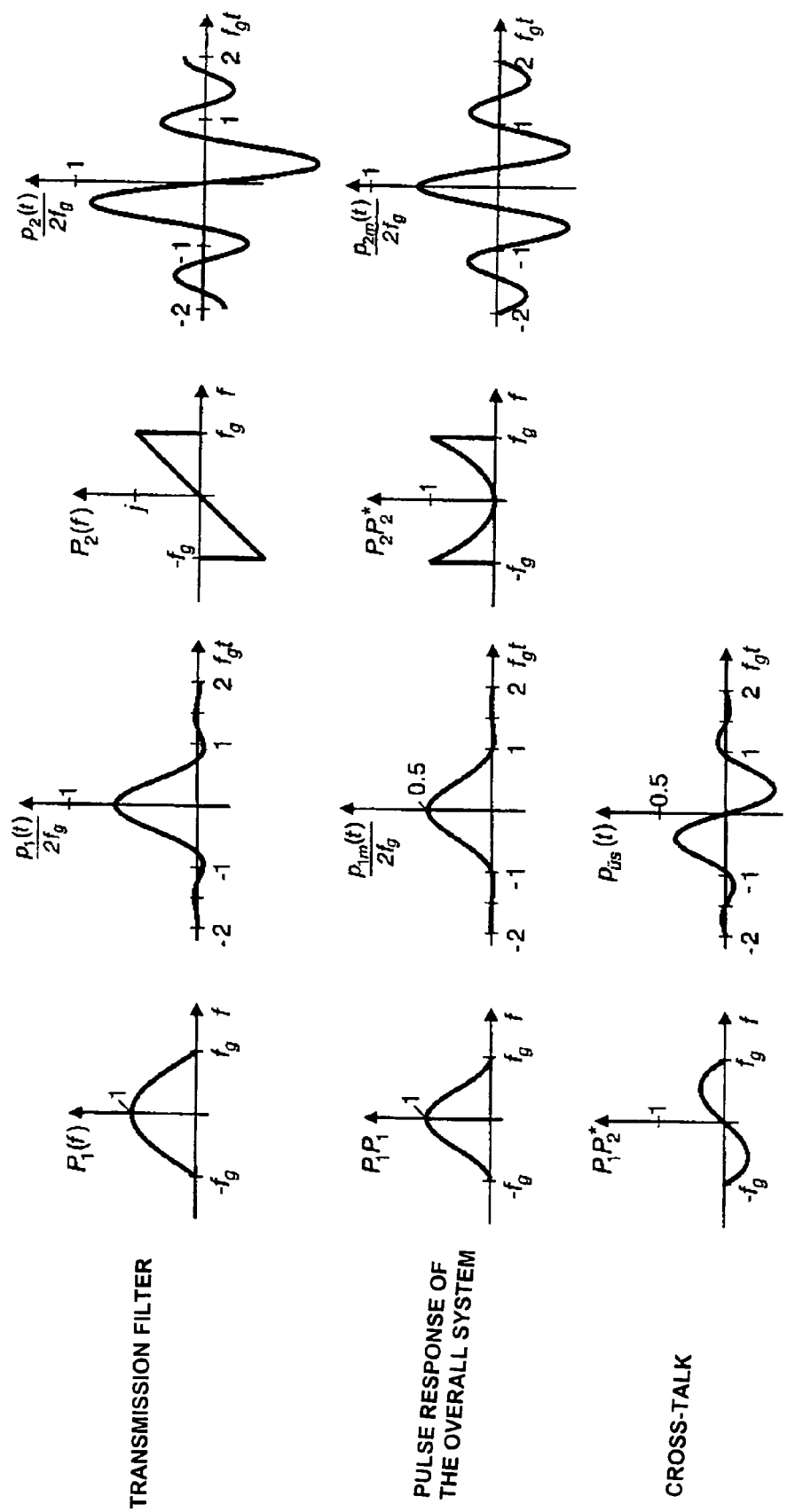

However, the question comes up whether the known example in FIG. 3a is particularly advantageous, since the two channels utilize the entire band width. In the case of a power-limited transmission channel, the interference intervals $E_b/N_o$ are equal, in the example according to FIG. 3a and in the design method corresponding to the filter pair example in FIG. 3b (and, of course, in the case of all other channels having Nyquist flanks at $\omega_g/2$) The filter pairs $P_1$ and $P_2$ are, as is also indicated in the state of the art in the IEEE, multiplied with the factor $\sqrt{2}$ during division into the lower and higher frequency range, with overlapping Nyquist flanks at $\omega_g/2$, in order to make $E_b/N_0$ the same as in QPSK. The peak amplitude is then smaller as compared with the example of FIG. 3a, which brings about a gain in the case of amplitude-limited channels, thereby documenting that the example of FIG. 3a is not advantageous. However, a gain occurs in the case of an expansion to multi-carrier systems of the Variant A. In the case of a roll-off factor of r=o, this is 3 dB. The example in FIG. 3a, with the greater peak amplitude, corresponds to a Variant B in the case of multi-carrier systems. For an implementation, the example of FIG. 3a would have to be freed of the perpendicular flanks. This is not possible without the occurrence of ISI and/or cross-talk.

FIG. 6 shows possibilities of a method implementation of the filtering of the signals $P_1$ and $P_2$ without cross-talk, and the transition to a multi-carrier system (Variant B).

In Example d, $P_1$ is given a root Nyquist flank at $\omega_g/2$ and $P_2$ is given root flanks at $\frac{1}{4}\omega_g$ and $\frac{3}{4}\omega_g$. As a result, the cross-talk is zero, because the spectrum of $P_1P_2^*$ is symmetrical to $\omega_g/2$ and point-symmetrical to $\omega=0$ (see also FIG. 4, bottom). In this connection, it is practical if $P_1^2$ and $P_2m$ are converted to the base band by means of demodulation. For avoiding cross-talk, it is important that $P_2$ is symmetrical around $\omega_g/2$ in the region of Example e shows that $P_1$ and $P_2$ can also be made equal in amount in this region. Additional channels having the same flanks can be added in the frequency multiplex. In this manner, one arrives at a multi-carrier system. In order for no cross-talk to occur, the individual channels must be separated in terms of frequency, in other words they are not allowed to overlap, at first, as is shown in Example f.

The root Nyquist flanks can also overlap, in terms of frequency, as shown in Example g. However, in this case, not only a square cross-talk but also an in-phase cross-talk occurs, which can be made to zero by means of an offset of adjacent channels by half a bit duration in the scanning time point (OQPSK).

This filter arrangement in the same frequency range will be called Variant B. As compared to Variant A, there is no advantage in the total bit rate, as was explained in connection with the explanation of FIG. 3a, which corresponds to Variant B. The filters in each channel (real or imaginary) form a Hilbert pair, as is known from the IEEE article. In the case of an implementation by means of modulation, it is recommended to convert with a carrier in the band center (two-sided band transmission). Variant B is known as a multi-carrier system from [4] and [5].

Figure 7:
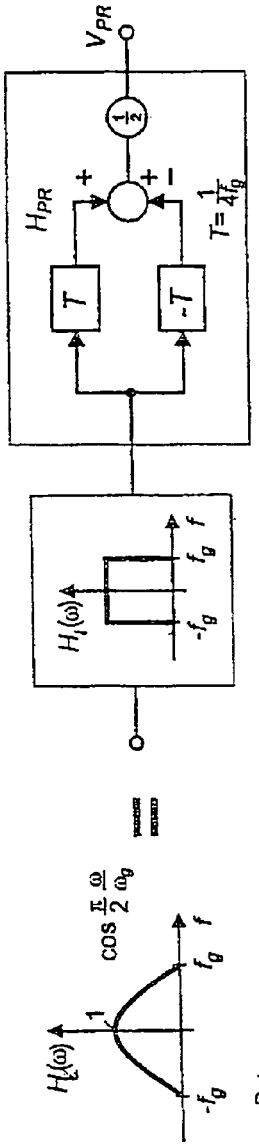
FIG. 7 shows a cosine crest channel $H_c(\omega)$ that supplies a corresponding pulse response.
Figure 7:
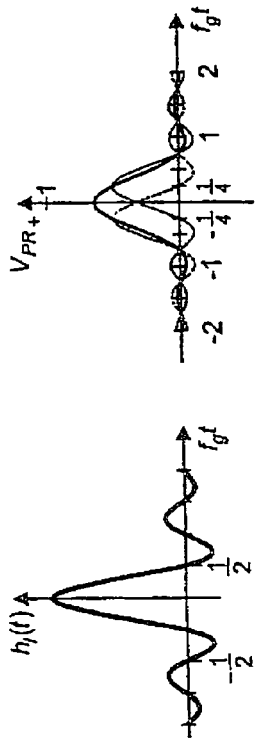
Figure 7:
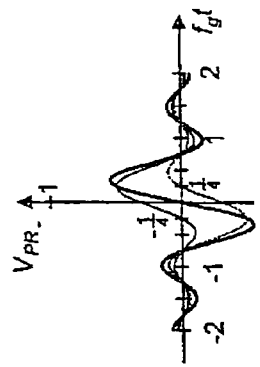

Expansion to Duobinary Transmission:

The expansion to partial-response or duobinary transmission is quite simple, according to the invention, taking into consideration the formation of a partial-response signal. It is known that the cosine crest channel $H_c(\omega)$ indicated in FIG. 7, top, supplies a corresponding pulse response. Transmission occurs by way of the cosine crest channel at the bit rate $2f_g$, as in the case of the ideal low-pass. Its pulse response can, as shown in FIG. 7, be indicated as two pulse responses of an ideal low-pass, multiplied by the factor $\frac{1}{2}$, which are offset relative to one another by the time $\frac{1}{2}f_g$, in other words the interval between the zero places of the sine function. With this, this pulse response that belongs to $H_c(\omega)$ again has zero places at the interval of $\frac{1}{2}f_g$, as is evident from the diagrams below the block schematic. Practically, two Dirac surges that follow one another at an interval of $\frac{1}{2}f_g$ are transmitted, instead of one Dirac surge $\delta(t)$. Now, scanning again takes place at the interval of $\frac{1}{2}f_g$ at the receiver, but offset by $\frac{1}{4}f_g$ as compared with the ideal low-pass. As a result, one obtains the values $\frac{1}{2}$ according to FIG. 7, at $\pm\frac{1}{4}f_g$ of the pulse response $V_{PR+}$. If additional positive and negative pulse responses follow, their scanning values are superimposed on one another. Therefore the values 0, +1, and −1 are formed. The 0 means that the bit has changed as compared to the previous one. By means of a known pre-coding, it can be achieved that the result is achieved by means of dual-path rectification that −1 in +1 can be used again for a binary decision about the threshold 0.5 to 0 or 1. However, in this connection, 3 dB of interference interval are lost. However, this is offset by the advantage that $H_c(\omega)$ does not have and does not have to have a perpendicular flank like the ideal low-pass. The loss of 3 dB can be avoided by means of a Viterbi decoding.

From FIG. 7, which reproduces a partial response (duobinary code), it can furthermore be derived that one can also subtract the pulse responses of the ideal low-pass that are offset by $\frac{1}{2}f_g$. The related pulse response $V_{PR}$ then has the scanning values $-\frac{1}{2}$ and $+\frac{1}{2}$. The transmission function $$H_s(\omega) = j\sin\frac{\pi}{2}\frac{\omega}{\omega_g} \qquad -\omega \le \omega \le \omega_g$$

belongs to the subtraction of the pulse responses.

Figure 8:
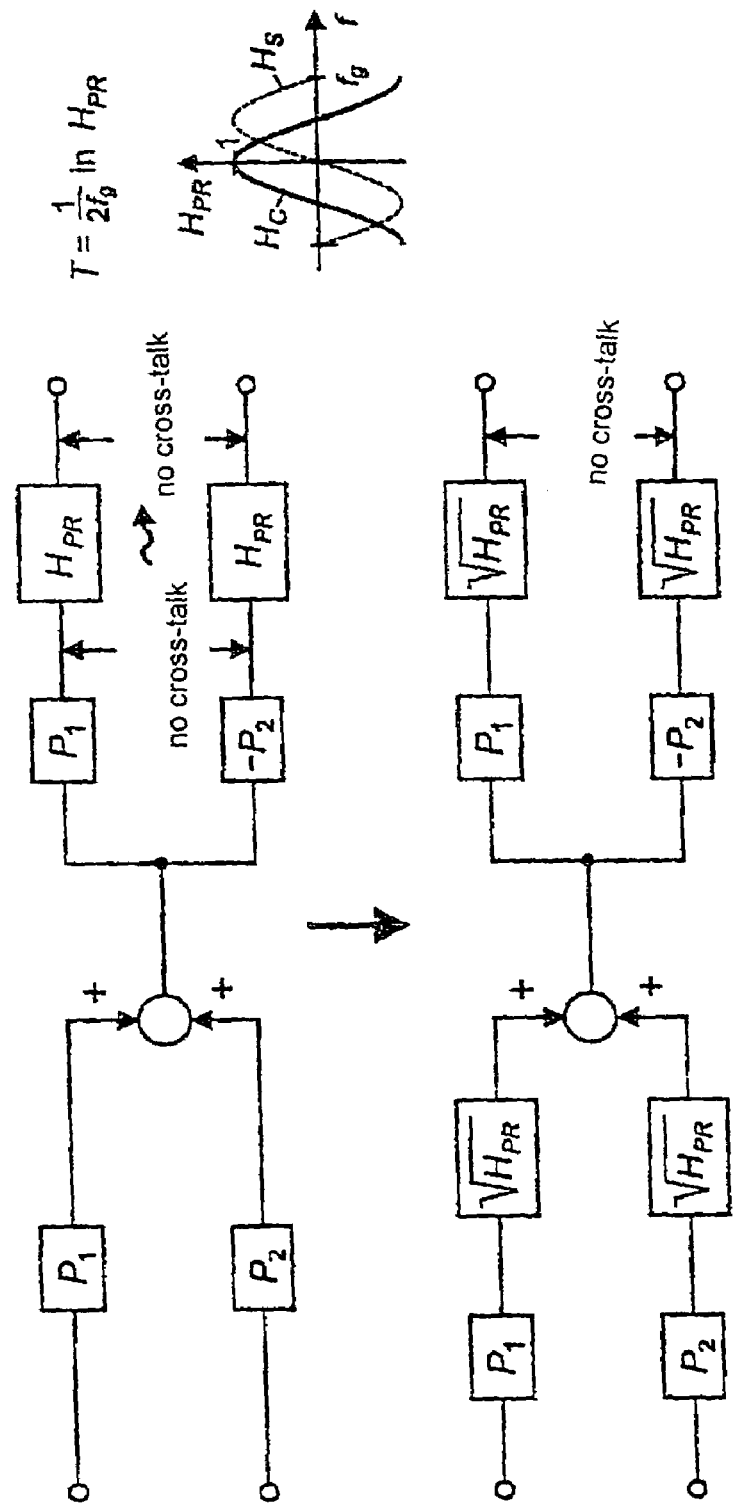
FIG. 8 shows a Q″PSK transmission with partial response.

The evaluation can be carried out, as in the case of the normal duobinary signal, by means of transmission-side pre-coding and reception-side dual-path rectification. In this method step, the bit inversion is supposed to be eliminated in the pre-coding, so that no negated bit sequence can occur. This modified duobinary coding is important for the following. In the case of Q²PSK, transmission takes place at half the bit rate $f_g$ per channel. Accordingly, the partial response filters $H_{PR}$ (FIG. 7) must be designed for $\omega_g/2$ instead of for $\omega_g$, i.e. $T=½f_g$, as indicated in FIG. 8, top right. In FIG. 8, a Q²PSK transmission is shown with partial response. In the block schematic at the top, it is indicated how the partial response filter must be subsequently switched on the reception side, in each instance. For a matched filter arrangement, it must be divided up between the transmission and reception side as $\sqrt{H_{PR}}$. However, this can only be done for the amount in the case of $H_s$ (FIG. 8, top right). In FIG. 8, right, the transmission functions $H_c$ and $H_s$ are shown in the diagram. $H_c$ is unsuitable for Q²PSK, because this would have the result of a sign change at $f_g/2$, and an inverting filter would have to be used on the reception side from [see original for formula, page 10, line 30, second formula in that line]. In contrast, it is much simpler and easier to implement $$\sqrt{|H_s(\omega)|} = \sqrt{\sin\pi\frac{|\omega|}{\omega_g}}$$

This function is inserted both on the transmission side and the reception side. In addition (e.g. on the reception side), a Hilbert filter with the transition function $H_H(\omega)=j\,\text{sign}(\omega)$ can be provided, in order to be able to derive an imaginary transmission function from a real one, and vice versa. In the case of implementation of the filters by means of modulation, a cosine carrier becomes a sine carrier, and vice versa; this is shown in FIG. 9 for the example in FIG. 3a, because this example is very easy to see in an overview.

Figure 9:
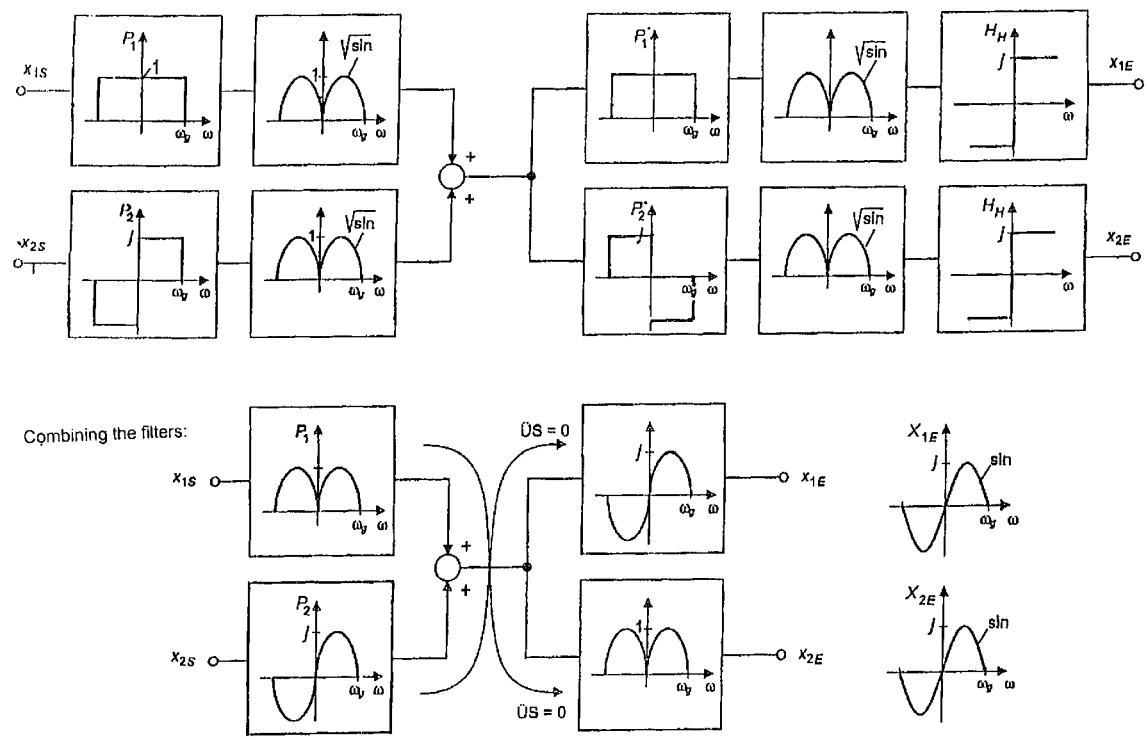
FIG. 9 shows a partial response system with individual filters.

In FIG. 9, which reproduces a partial response system, the individual filters are shown at the top in a combination for a response system. In the case that $P_1$ and $P_2$ form a Hilbert pair, the places $P_1^*$ and $P_2^*$ on the reception side are simply interchanged, if the Hilbert filter is combined from $P_1^*$ and $P_2^*$. A loss in interference interval is not connected with this, since the noise output and the amount of the scanning value of the wanted signal remain unchanged.

In the following, implementation by means of modulation and demodulation and transition to Q"PSK will be described.

While $P_1$ is a low-pass, $P_2$, on the other hand, is a band pass. The pulse responses belonging to $P_2P_2^*$ are at a much "higher frequency" than the ones that belong to $P_1^2$, as is evident from the examples in FIG. 3b-3c. A bit rate of $f_g$ can be transmitted in the band pass $P_2P_2^*$. In the case of the implementation of the band pass $P_2$ by means of modulation, the carrier is not allowed to be placed in the band center of $P_2$, which would correspond to two-sided band modulation, but instead, one must work with remaining side band modulation. This is the decisive difference as compared with Variant B, in which one would use two-sided band modulation.

Figure 10:
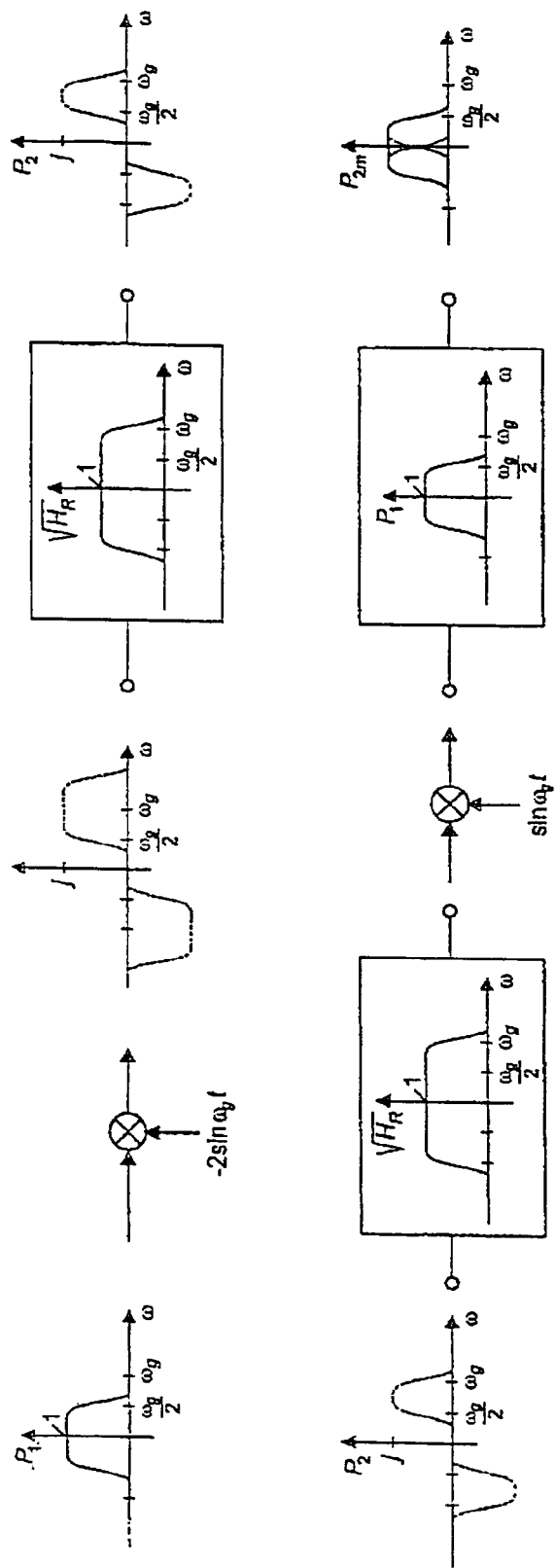
FIG. 10 shows the implementation of $P_2$ by means of modulation and reception-side demodulation of $P_2$ and transition to Q″PSK in the upper part, how $P_2$ is demodulated in the low-pass range in the center part, and the root Nyquist filter on the reception side combined with the reception filter in the lower part.
Figure 10:
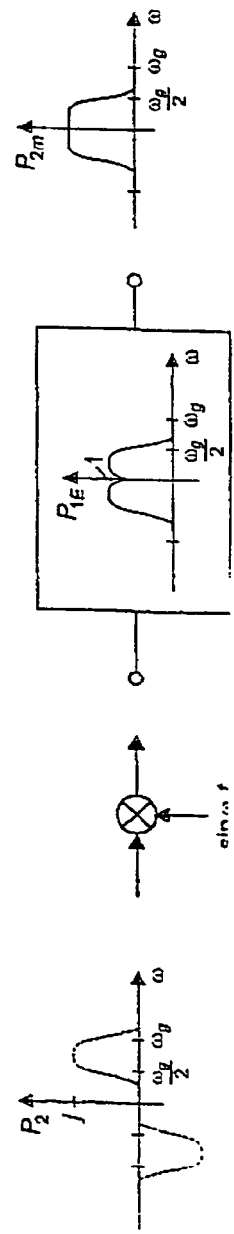

FIG. 10 shows the implementation of $P_2$ by means of modulation and reception-side demodulation of $P_2$ and transition to Q"PSK in the upper part, whereby a lower side band between $\omega_g/2$ and $\omega_g$ is generated by means of frequency conversion from $P_1$ to $P_2$. In order to have a Nyquist flank at $\omega_g$, filtering takes place with a root Nyquist filter at $\omega_g$, and one obtains $P_2$. The Nyquist flank at $\omega_g$ can be different from the one at $\omega_g/2$, in principle.

In the center part of FIG. 10 (reception input) it is shown how $P_2$ is demodulated in the low-pass range. The signal is first sent by way of the same root Nyquist low-pass as during modulation. In this way, a Nyquist flank is achieved at $\omega_g$. By means of demodulation and low-pass filtering with $P_1$, one obtains the desired transmission function $P_1^2$, by way of which transmission can take place at the bit rate $f_g$. It is essential that the demodulation carrier sits on the root Nyquist flank. The filter could also be a high-pass or a band pass. A band pass can easily be implemented at various frequencies by means of poly-phase filters. After the demodulation, a simple filter for suppressing the portions of the double carrier frequency is then all that is required. This method of demodulation, with poly-phase filters, is advantageous in the case of multi-carrier systems.

The root Nyquist filter on the reception side serves to generate Nyquist flanks at w=0 after the frequency conversion, which flanks add up to a constant value in the surroundings of $\omega=0$. However, this filter can also be combined with the reception filter, as is shown in the lower part of FIG. 10, "Combining the filters." Without the filtering on the reception side, the root Nyquist flanks would add up to a hump with the maximal value $\sqrt{2}$ at $\omega=0$. By means of a reception filter $P_{1E}$, however, which is inverse in the region of the root Nyquist flanks $\omega=0$, this can be equalized.

In the case of a multi-carrier system, real and imaginary channels alternate in the case of Variant A. For the modulation and demodulation of the real channels, it is practical to perform the conversion with $\cos\omega_g t$.

In this connection, conversion should take place by way of an intermediate frequency, in order to be able to make the root Nyquist filter $\sqrt{H_R}$ the same for every channel. The conversion of the channels can, of course, take place into the high-frequency range, right away, without having to undertake another conversion with two orthogonal carriers. In this case, the orthogonal carriers are therefore completely eliminated (multi-carrier system).

Figure 11:
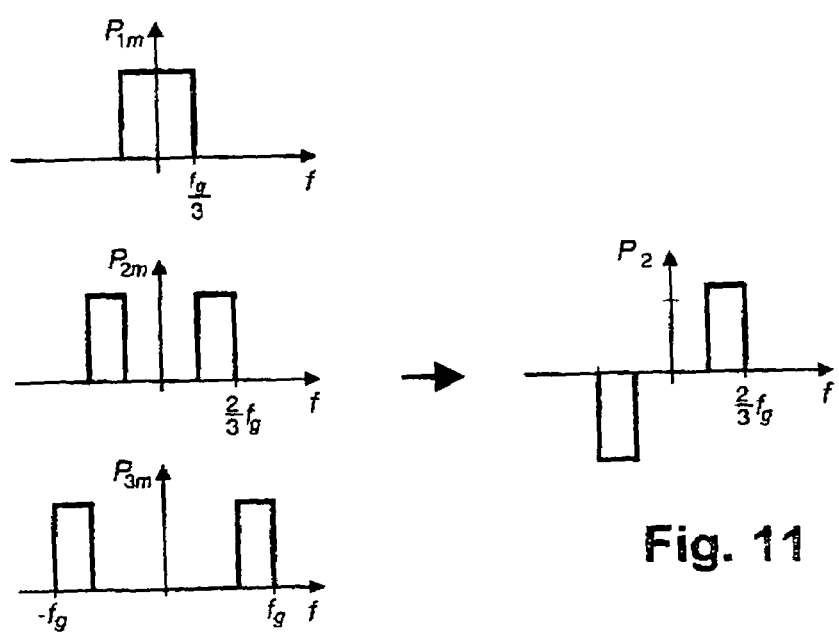
FIG. 11 shows schematically for three channels the principle of dividing the transmission channel $H_i$ up into two channels expanded to several frequency ranges, with the Nyquist flanks at the separation points left out.

The principle of dividing the transmission channel $H_t$ up into two frequency ranges can furthermore be expanded to several frequency ranges. FIG. 11 shows this schematically for three channels, whereby the Nyquist flanks at the separation points have been left out. The center filter $P_{2m}$ is divided up into $P_2$. Then, there is no cross-talk either between the channels 1 and 2 or between the channels 2 and 3. Furthermore, there is no cross-talk between channels 1 and 3, since these are separated in terms of frequency, as long as their Nyquist flanks do not fall into one another. This method can be expanded to n channels, thereby obtaining an arrangement in the basic band, which must then be applied to a cosine carrier and a sine carrier.

Figure 12:
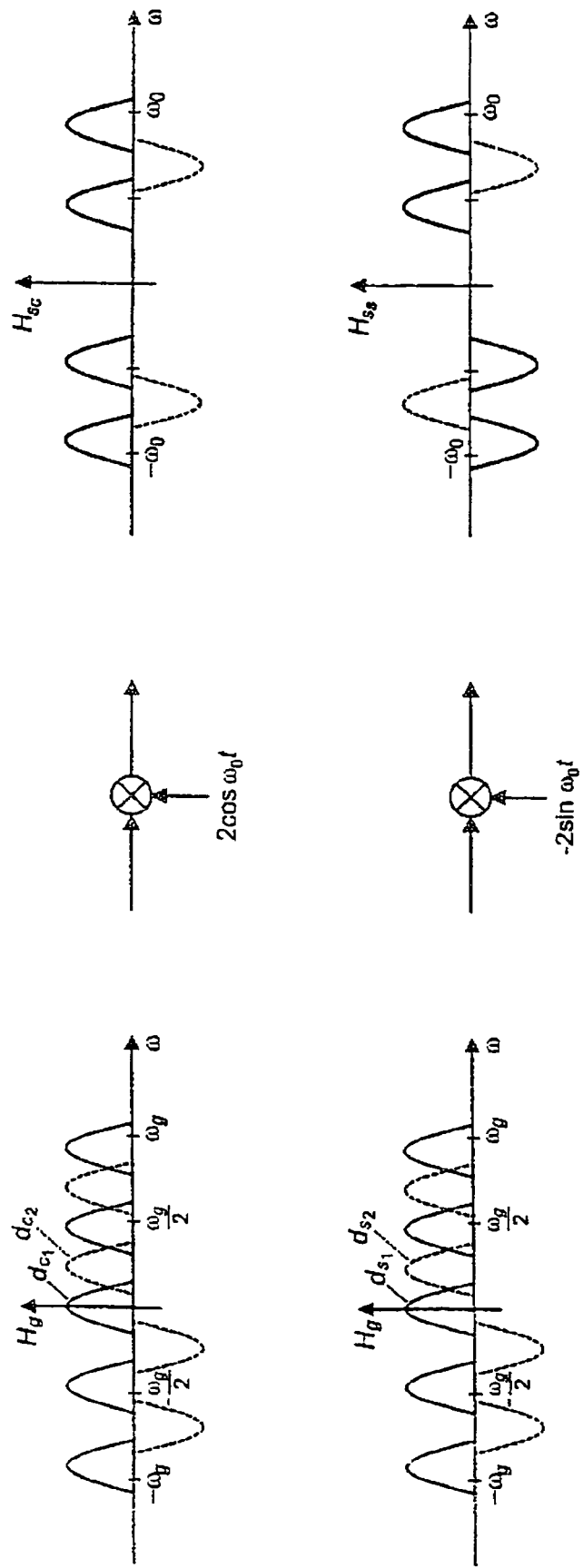
FIG. 12 shows the transition to Q″PSK and the overall spectrum $H_g(\omega)$, with the purely imaginary spectra shown with broken lines.

FIG. 12 illustrates the transition to Q"PSK and the overall spectrum $H_g(\omega)$, whereby the purely imaginary spectra are shown with broken lines. In this connection, the partial signals are modulated in binary manner with 0 and 1. The data in the cosine branch are designated as $d_{c1}, \ldots d_{c2} \ldots$, those in the sine branch as $d_{s1}, .d_{s2} \ldots$. Since the carrier frequencies are equidistant, it is obvious to perform the modulation with IDFT and the demodulation with DFT.

As compared with an OFDM, the following advantages are obtained:

Adjacent channels are not allowed to overlap, without there being cross-talk, because in the case of Variant A, a purely real spectrum always overlaps with a purely imaginary one having symmetrical flanks.

In the case of OFDM, the carriers must lie very precisely in the zero passages of the si spectra that are formed by the rectangular pulse scanning, which is not critical here.

The spectrum is compact and does not have the si runners.

The crest factor is less, because what is being transmitted is not scanned sine and cosine vibrations, but rather pulses that die out.

The power density spectrum of the transmission signal is constant, since the power density spectra of adjacent channels supplement one another to form a constant value, because of the Nyquist flanks.

Fundamentally, in the case of Variant B, after the demodulation and filtering, cross-talk occurs also in the basic band (as is evident from FIG. 13, which illustrates the in-channel square cross-talk (IKQÜS), above) not only in the upper and lower adjacent channels, but also in the channel transmitted in squared form, in the same frequency band, in other words five times cross-talk. In the case of a distortion-free transmission channel, however, this cross-talk is completely compensated, with an equalizer having to be used, if necessary. This cross-talk will be called in-channel square cross-talk (IKQÜS).

Also in the case of Variant A (as is evident from FIG. 13, bottom), IKQÜS occurs from the overlapping on the remaining side band flank (RSB flank), in other words two times cross-talk, which compensates only in the case of distortion-free transmission. However, it is much less than in the case of Variant B, and therefore Variant A is more advantageous in this regard for certain applications (DAB, DVB-T, mobile wireless), in the case of frequency-selective channels.

In FIG. 10 and also in FIG. 12, the RSB flank at the carrier frequency $\omega_g$ and the other flank at the lower frequency $\omega_g/2$ have been made equal. However, it is also possible, in advantageous manner, to make the RSB flank very much steeper, as is evident from FIG. 14, top (roll-off $r_T$ after filtering with $\sqrt{H_R(\omega)}$, demodulation with $\omega_0$, and root Nyquist flank filtering). One-sided band modulation results for $r_T=0$. In this way, the IKQÜS can be made as small as desired, in principle. The root Nyquist flank at $\omega_n$ results in the Nyquist flank in the basic band with roll-off r after demodulation and corresponding root Nyquist filtering. In order for the two flanks at $\omega_0$ and $\omega_n$ not to overlap, $r+r_T$ must be $\leq 1$. FIG. 14 shows how one can advantageously arrange the channels in the case of multi-channel transmission. It indicates the reduction of the IKQÜS in the case of Variant A. The transmission spectrum $S(\omega)$ is indicated.

Figure 15:
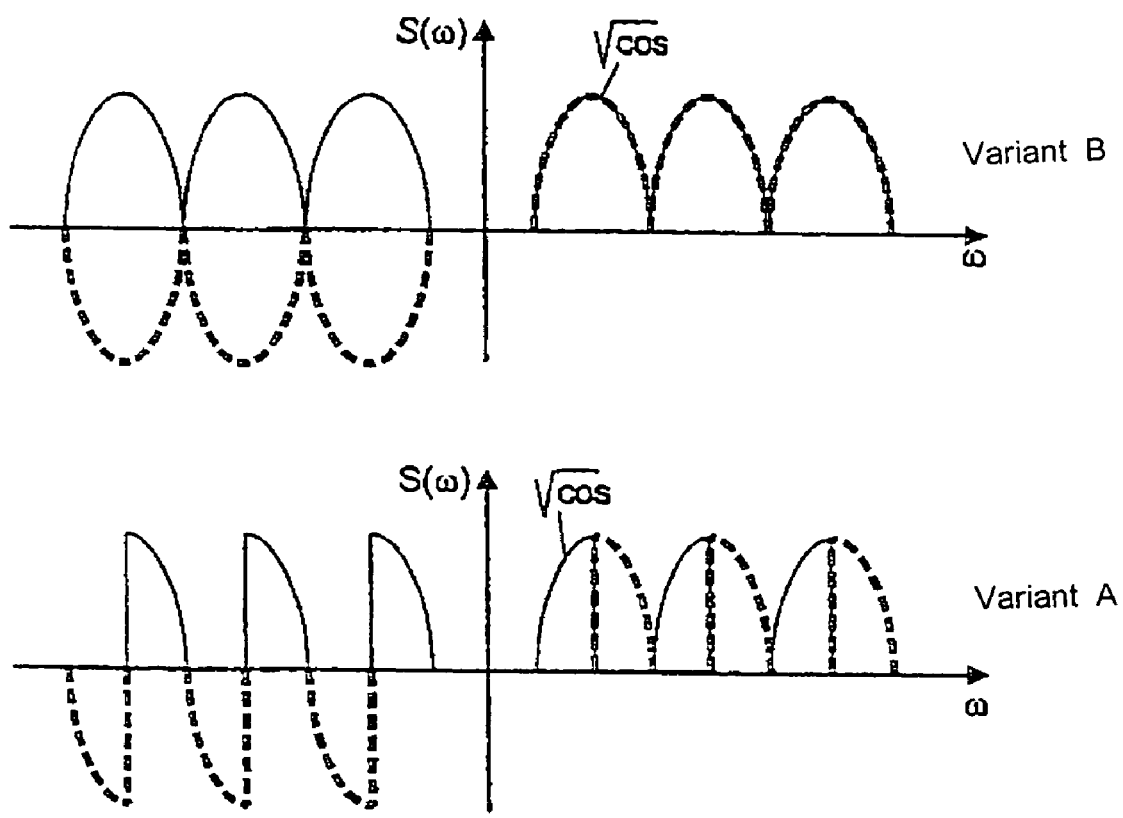
FIG. 15 shows the duobinary multi-channel transmission using the example of a transmission spectrum $S(\omega)$ for Variant A and Variant B.

In FIG. 15, the duobinary multi-channel transmission is shown, using the example of a transmission spectrum $S(\omega)$ for the two Variants A and B. Variant B is known as a multi-carrier system from IEEE Transactions on Communications COM-15, No. 6 (December 1967) pages 805-811 as well as COM-29, No. 7 (July 1981), pages 982-989, with another solution approach. According to the known circuit, 2L basic band data with equidistant sine and cosine carriers are directly converted to the HF range by way of filters on the transmission and reception side, in two-sided band modulation with the frequencies $f_k(k=1 \ldots L)$. The spectra overlap with the Nyquist flanks, i.e. the root Nyquist flanks. On the reception side, demodulation takes place with the same carriers.

In this connection, cross-talk pulses are also obtained, but they are two different ones, namely the square ÜS (cross-talk), which has zero places in the scanning time points, according to the invention, and the in-phase ÜS (cross-talk), which has a symmetrical spectrum around the Nyquist flank. The related time signal is multiplied by the cosine and has shifted its zero places by half the bit duration.

Implementation of the transmission-side RSB filter for the upper and lower RSB (flank below and above the carrier, respectively) advantageously takes place in the basic band, with subsequent modulation. This is shown in the following, for the root Nyquist flank with roll-off $r_T$.

Figure 16:
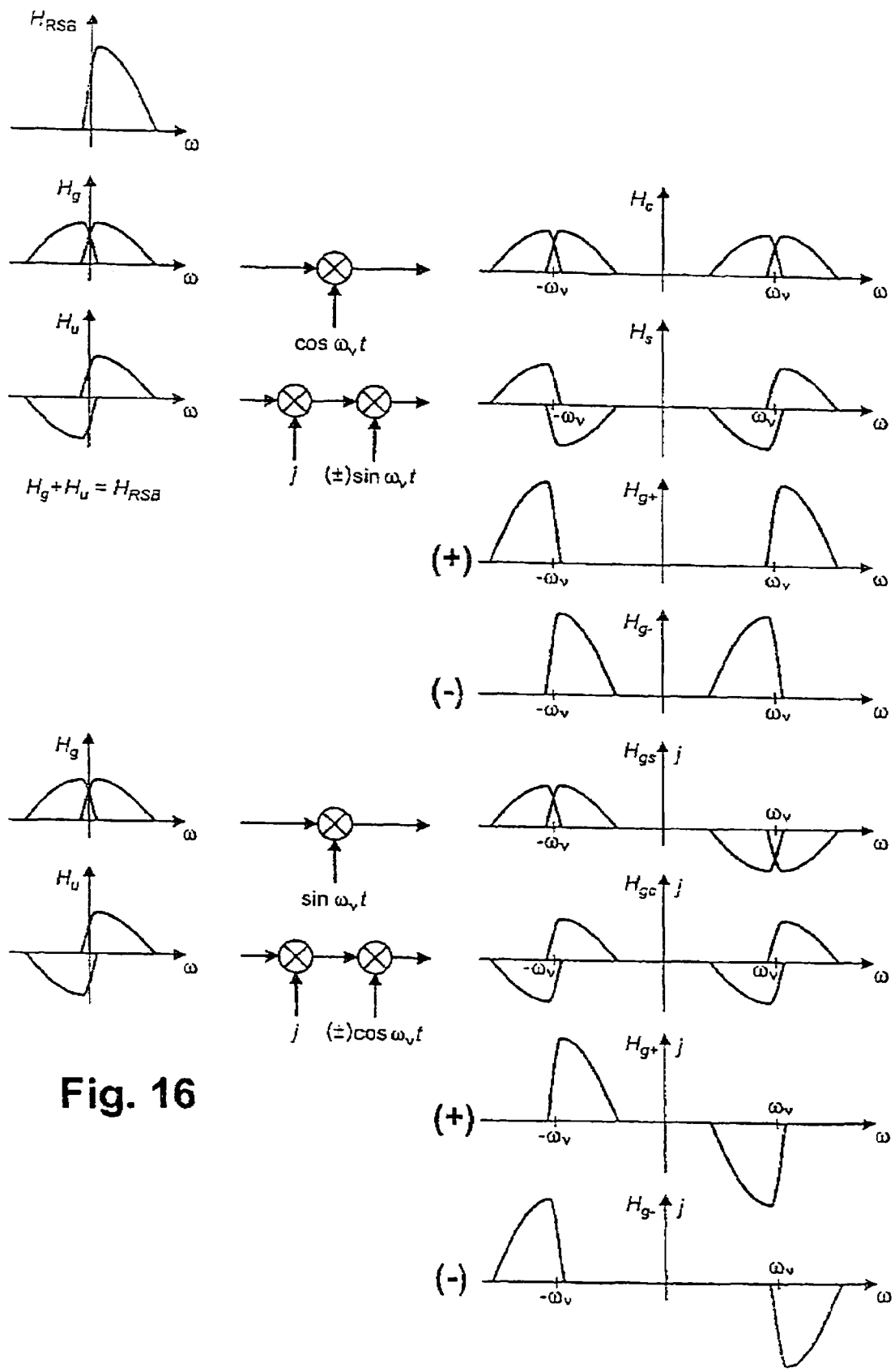
FIG. 16 shows the implementation of the transmitter-side RSB filtering, in which the RSB filter which is shifted into the basic band is broken down into the even and odd portion $H_g(j\omega)$ and $H_u(j\omega)$.

According to FIG. 16, which indicates the implementation of the transmitter-side RSB filtering, the RSB filter which is shifted into the basic band in this connection is broken down into the even and odd portion $H_g(\omega)$ and $H_u(j\omega)$. The odd portion is multiplied by j (again, a real time function belongs to $jH_u(j\omega)$). Afterwards, conversion with a cosine carrier and a sine carrier takes place. The two portions are added or subtracted and, according to FIG. 16, result in RSB filters with the RSB flank at the lower and upper band end, respectively.

If the other flank is also designed as a root Nyquist flank (roll-off r) as in FIG. 15, the reception-side filtering with $P_1$ according to FIG. 10 can be eliminated, and replaced by a simple low-pass suppression of the higher frequency portions that occur during demodulation. The two low-pass filters $H_g(j\omega)$ and $jH_u(j\omega)$ can be implemented as FIR filters, in accordance with their pulse responses.

The transmission functions that have been implemented are real. For imaginary transmission functions, as they occur in every other channel in Variant A, the cosine carrier and the sine carrier must be interchanged. This is shown in the lower part of FIG. 16.

On the reception side, real and imaginary spectra overlap, as was already indicated. FIG. 10 must be filtered with a root Nyquist filter. Suppression by means of compensation is not possible.

According to FIG. 15, one-sided band modulation has been selected for Variant A, to generate the cos channel, which would require a filter having a perpendicular flank. The duobinary multi-carrier transmission is shown using the transmission spectrum $S(\omega)$. In the following, it will be shown that this is not necessary.

Figure 17:
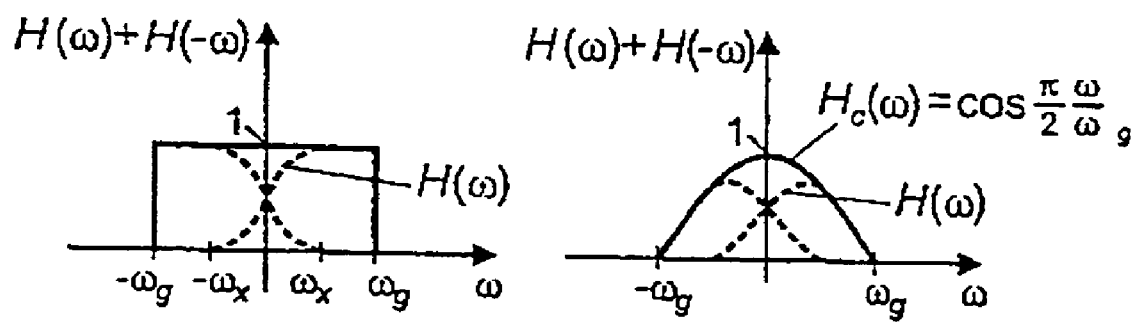
FIG. 17 shows an addition of flanks $H(\omega)$.

According to FIG. 17, which indicates an addition of flanks $H(\omega)$ (specifically 17a) addition to 1, 17b) addition to $H_c(\omega)$), mirror-image Nyquist flanks add up to the value 1. This can be easily shown. The Nyquist flank can be written as $$H(\omega)=0{,}5+U(\omega).$$

$U(\omega)$ is an odd function having the properties $U(0)=0$ and $U(\omega_x)=0.5$. For example, in the case of cos roll-off, $$U(\omega) = 0{,}5\sin\frac{\pi}{2}\frac{\omega}{\omega_x} \qquad -\omega_x \leq \omega \leq \omega_x.$$

Therefore $$H(\omega)+H(\omega)=1$$

where $\omega_x = r_T \cdot \omega_g$.

If the flanks are supposed to add up not to 1, but rather, as in FIG. 7, on the right, to $H_c$, no Nyquist flanks are allowed to be used in the case of the carrier frequencies. It must be true that $$H(\omega) + H(-\omega) = H_c(\omega) = \cos\frac{\pi}{2}\frac{\omega}{\omega_g}$$

The flank $H(\omega)$ can be determined using the approach $$H(\omega) = \chi_1 \cos\frac{\pi}{2}\frac{\omega}{\omega_g} + \chi_2 U(\omega)$$

Equation (5), inserted in Equation (4), yields $X_1=0.5$. If one requires, in practical manner, that $H(-\omega_x)=0$ and $$H(\omega_\chi) = H_c(\omega_\chi) = \cos\frac{\pi}{2}\frac{\omega_\chi}{\omega_g},$$

therefore it follows that $$\omega_2 = \cos\frac{\pi}{2}\frac{\omega_\chi}{\omega_g}.$$

For the cos roll-off, this means that $$H(\omega) = 0.5\left(\cos\frac{\pi}{2}\frac{\omega}{\omega_g} + \cos\left(\frac{\pi}{2}\frac{\omega_\chi}{\omega_g}\right)\cdot\sin\frac{\pi}{2}\frac{\omega}{\omega_\chi}\right) \quad -\omega_\chi \leq \omega \leq \omega_\chi.$$

With this, the perpendicular flank can be avoided in the case of Variant A, and adjacent channels overlap. The greater the overlap, the greater the IKQÜS, of course. It is noteworthy that now, Variant A passes over into Variant B at $\omega_x = \omega_g$.

This method of procedure is not limited to the cos function but rather can also be used for other functions.

The invention claimed is:

1. Method for dividing a bit rate of QPSK signals into at least two channels having band width limited filters in a modulator and a demodulator, by means of splitting a bit stream of the QPSK signals into two bit streams, comprising the following characteristics:

Transmitting the two bit streams by means of at least two filter branches ($P_1P_1^*$; $P_2P_2^*$), into at least one purely real spectrum ($P_1$) and at least one purely imaginary spectrum ($P_2$), by means of filters ($P_1^*$ and $P_2^*$) that form pulse former pairs, whereby the divided bit stream is transmitted at half the bit rate $f_9$ and, for an expansion to multi-carrier systems, an alternating real and imaginary spectra are implemented by a low-pass filter ($P_1$) and subsequent modulation with equidistant cosine and sine carriers, and remaining side band (RSB) filtering takes place, in which the purely imaginary spectrum ($P_2$ is determined from the difference of a low-pass having a band width $f_g$ and of the low-pass $P_1$ having the band width $f_g/2$, whereby zero places of the pulse responses in the two filter branches ($P_1 \times P_1^*$ and $P_2 \times P_2^*$) lie at a multiple of $1/f_g$, and the transmitted bit rate lies at $f_g$, in each instance, and the spectra are band-limited;

Modulating the divided QPSK signals with the sine carrier or the cosine carrier, in each instance;

Transmitting the signal obtained in this manner to a receiver with the demodulator, and demodulation of the signal;

Dividing the received signal by means of at least two filter branches with a purely real transmission function ($P_1^*$) and a purely imaginary transmission function ($P_2^*$) by means of at least two filter branches having filters ($P_1^*$ and $P_2^*$) that form pulse former pairs, into at least two purely real spectra ($P_1 \times P_1^*$ and $P_2 \times P_2^*$), whereby the divided signal is transmitted at half the bit rate $f_g$;

Demodulating the signals having a higher frequency by means of RSB filtering and evaluation as a basic band signal;

wherein the at least one purely real spectrum ($P_1$) has an upper flank and the at least one purely imaginary spectrum ($P_2$) has an upper flank and a lower flank; and wherein roots of the Nyquist flanks lie symmetrical to a frequency $\omega_g/2$ for the upper flank of $P_1$ and the lower flank of $P_2$, and lie at $\omega_g$ for the upper flank of $P_2$.

2. Method as recited in claim 1, wherein the pulse responses of the filter pairs are multiplied by a factor Ö2 after the division into an upper and a lower frequency range, with overlapping Nyquist flanks at $\omega/2$.

3. Method as recited in 1, wherein the following functions $$\sqrt{|H_s(\omega)|} = \sqrt{\sin\pi\frac{|\omega|}{\omega_g}}$$

are inserted on the transmitter side and/or the reception side, and additionally, a Hilbert filter is inserted in the $P_2$ branch, thereby achieving a duobinary or partial response coding.

4. Method as recited in claim 3, wherein on the transmitter side, the filters ($P_1$ and $P_2$) form a Hilbert pair, and on the reception side, scanning samples of the reception-side filters ($P_1^*$ and $P_2^*$) are interchanged in terms of their places.

5. Method as recited in claim 3, wherein the filter ($P_1$) is one having a root sine frequency passage in the range $-\omega_g \ldots \omega_g$ and that the filter ($P_2$) is implemented by means of multiplication with j sign($\omega$) and the reception filters correspond to the transmission filters, but interchanged.

6. Method as recited in claim 3, wherein in the first filter branch, a low-pass ($P_1$) is provided, and in the second filter branch, a band pass ($P_2$) is provided, and wherein the pulse responses in the filter branches ($P_2 \times P_2^*$) have a higher frequency than the pulse responses that belong to a product $P_{12}$ of the low-pass branches, and wherein these pulse responses at a the higher frequency are evaluated by means of RSB filtering in the basic band range.

7. Method as recited in claim 6, wherein the band pass ($P_2$) in the second filter branch is implemented by means of RSB-modulation using the filter $P_1$.

8. Method as recited in claim 1, wherein in the case of multi-carrier systems, the real and imaginary channels alternate and wherein this is done by means of RSB-modulation with cosine and sine carriers.

9. Method as recited in claim 1, wherein a cosine crest channel ($H_c(\omega)$) is used, in order to completely avoid cross-talk of adjacent channels, whereby a remaining side band filtering is also carried out in order to form a duobinary coding.

10. Method as recited in claim 9, wherein a loss of approximately 3 dB that occurs in the case of duobinary transmission with pre-coding and dual-path rectification is avoided by means of Viterbi decoding.

11. Method as recited in claim 9, wherein the case of RSB modulation, the flank at the carrier is shaped in such a manner that after demodulation, the cosine crest channel is obtained.

12. Method as recited in claim 1, wherein the transmitter-side RSB filters are shifted into the basic band with the transmission function $H_{RSB}$ and the transmission function is broken down into an even portion ($H_g(j\omega)$) and an odd portion ($H_u(j\omega)$), and the odd portion ($H_u(j\omega)$) is multiplied by j to restore a real time function ($jH_u(j\omega)$), before a conversion by means of the cosine carrier and the sine carrier takes place, and that the two portions are added or subtracted.

13. Method as recited in 12, wherein the flank of the RSB filters is designed as a root Nyquist flank and that on the reception side, the higher frequency portions that occur during demodulation are suppressed by means of simple low-pass filters.

* * * * *